United States Patent [19]

Cooper, Jr.

[11] 4,213,732

[45] Jul. 22, 1980

[54] APPARATUS FOR REMOTELY REPAIRING TUBES IN A STEAM GENERATOR

[75] Inventor: Frank W. Cooper, Jr., Monroeville, Pa.

[73] Assignee: Westinghouse Electric Corp., Pittsburgh, Pa.

[21] Appl. No.: 895,831

[22] Filed: Apr. 13, 1978

[51] Int. Cl.² .............................................. B65G 47/90
[52] U.S. Cl. .............................. 414/728; 29/402.01; 165/76; 414/729; 414/743; 414/744 R
[58] Field of Search .................. 214/1 R, 1 H, 147 T, 214/1 BC, 1 BD, 1 BB, 1 BT, 1 B, 1 BS, 1 CM, 130 R, 148, 1 SW, 146.5, 130 A, 1 BH, 140, 149, 1 BV, 151; 29/401; 165/76; 414/728, 732–735, 743, 738–741, 729, 744

[56] References Cited

U.S. PATENT DOCUMENTS

| 3,236,397 | 2/1966 | Lakin | 214/1 H |
| 3,740,820 | 6/1973 | Tarves, Jr. | 29/401 |
| 3,913,752 | 10/1975 | Ward et al. | 214/1 BB |
| 3,934,731 | 1/1976 | Muller et al. | 214/1 BB |

FOREIGN PATENT DOCUMENTS 965727  4/1975  Canada ................................ 214/1 H Primary Examiner—Frank E. Werner
Attorney, Agent, or Firm—J. W. Keen

[57] ABSTRACT

Apparatus that may be assembled inside the head of a steam generator and can perform various repair and inspection operations on the steam generator's tubes and tubesheet. Selective engagement of an included tool holder and associated tools with the tube and tubesheet is provided by a gear train which has a portion which houses a tool drive motor. The drive motor provides power to a tool holder-mounted tool chuck for driving the various tools insertable therein.

10 Claims, 5 Drawing Figures

APPARATUS FOR REMOTELY REPAIRING TUBES IN A STEAM GENERATOR

BACKGROUND OF THE INVENTION

1. Field of the Invention:

This invention relates to nuclear steam generators and more particularly to apparatus for remotely repairing the tubes and tubesheet in a nuclear steam generator.

Radioactive contaminants in the primary fluid of a pressurized water nuclear reactor system sometimes deposit on the tubes and in the channel head of the nuclear steam generator causing repair personnel who work within the channel head to be subjected to significant radioactivity. It is desirable to provide an apparatus which can effectively inspect and repair tubes and the associated tubesheet within the steam generator from a remote location so as to reduce the exposure of work personnel to the radiation present within the channel head.

2. Description of the Prior Art:

Copending patent application whose serial number and filing date are respectively Ser. No. 888,701 and Mar. 21, 1978 shows an apparatus similar to the present invention. Such apparatus, however, utilized hydraulic positioning means for moving the apparatus' platform portion relative to the base along a direction known as the Z axis. While the aforementioned apparatus admirably performed the required repair work within the channel head, its hydraulic positioning mechanism lacked the extreme precision and stability which was sometimes necessary for certain specific tool operations. Due to inherent characteristics of two-way hydraulic cylinders, the prior art's positioning mechanism was found to be somewhat slow in one of the two directions of travel.

SUMMARY OF THE INVENTION

An apparatus for remotely repairing a tubesheet and tubes associated therewith in a channel head of a steam generator when made in accordance with this invention comprises a column rotatably disposed in the head generally perpendicular to the tubesheet with one end of the column terminating a predetermined distance from the tubesheet, a boom pivotally mounted adjacent the terminal end of the column, a device for rotating the column and boom therewith, a locking device for securing the column and boom in any rotated position, a device for pivoting the boom between positions generally parallel to the tubesheet and generally aligned with a manway disposed in the steam generator's head, a carriage disposed to translate along the boom, a mechanism for moving the carriage along the boom and locking it at any position thereon. The carriage constitutes a base disposed generally parallel to the tubesheet when the boom's longitudinal axis is generally parallel to the tubesheet, a platform disposed generally parallel to the base, a positioning motor and associated gear train for moving the platform relative to the base, a mechanism for maintaining a parallel relation between the platform and base during relative movement therebetween, a tool holder cantilevered over and supported by the platform, a tool chuck associated with the platform for grasping tools inserted therein, and a drive motor which is movable with the platform and provides power for driving the tool-grasping chuck which is disposed on the distal end of the cantilevered tool holder. The tool drive motor is housed within a gear of the positioning gear train.

BRIEF DESCRIPTION OF THE DRAWINGS

The objects and advantages of the present invention will be more fully understood from the following detailed description of the preferred embodiment, taken in connection with the accompanying drawings, in which.

DESCRIPTION OF THE PREFERRED EMBODIMENT

Patent Application Ser. No. 888,701 was filed Mar. 21, 1978 and is hereby incorporated by reference in its entirety.

Figure 1:
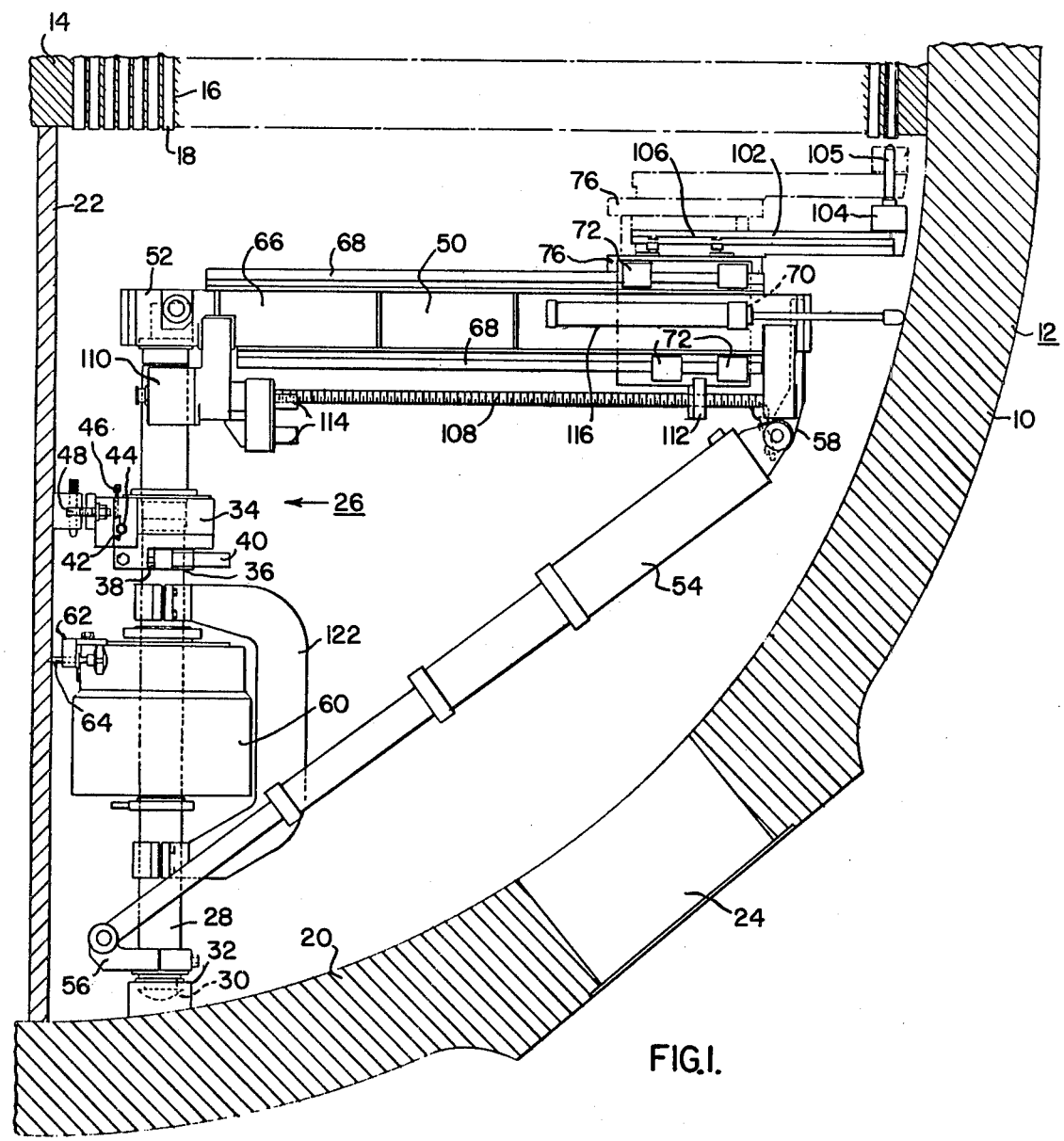
FIG. 1 is a partial sectional view of a steam generator head with an apparatus made in accordance with the present invention disposed therein for remotely repairing the tubes and tubesheets.

Referring now to the drawings in detail, FIG. 1 illustrates a portion of channel head 10 included in a steam generator 12 which also has a tubesheet 14 with a plurality of holes 16 formed therein. Tubes 18 are disposed in holes 16 and extend upwardly in operational position from tubesheet 14. The channel head 10 has a generally hemispherical wall 20 and is divided into an inlet portion and outlet portion (only one of which is shown in the drawings) by a dividing plate 22. Each portion has a manway 24 disposed in the wall 20, but it is to be understood that the present invention can be utilized with equal facility in a channel head 10 whose inlet and outlet portions are accessible through a single manway 24.

An apparatus for remotely repairing and inspecting the tubes 18 and tubesheet 14 is generally indicated at 26 disposed in one portion of the channel head 10 and comprises a vertically oriented column 28 which is pivotally connected to the wall 20 of the channel head 10 and extends generally upwardly therefrom. The column 28 is generally perpendicular to the tubesheet 14 and is disposed adjacent the dividing plate 22. A spherical bearing 30 is disposed at the foot of column 28 in a bearing housing 32 which is fastened to the wall 20 by welding or other means and forms a first support means for the column 28. A second support means 34 is fastened to the dividing plate 22 by welding or other means and is disposed intermediate the ends of column 28. The second support means 34 includes an anti-friction apparatus such as ball or roller bearings (not shown) which are disposed about and permit rotation of column 28 therein. Split collar 36 is included in the second support means 34 and has a gap 38 which may be closed by hydraulic cylinder 40 to lock the column 28 in any selected rotated position.

As shown in FIG. 1, the second support 34 has X and Y adjustments in a plane generally parallel to the tubesheet for insuring proper column alignment perpendicular to tubesheet 14. Movement in the X direction is afforded by dovetail 42 and adjusting screw 44. A set screw 46 locks the dovetail 42 in position when the column 28 is plumb in one direction. The other degree of movement, Y, is provided by jackscrews and clevis mounted bolts 48 or other appropriate means such as shims. The terminal or upper end of column 28 terminates a predetermined distance from the tubesheet 14 so as to avoid rotating interference therewith.

A boom 50 is pivotally connected to the terminal end of column 28 by a suitable mounting bracket 52. The pivotal connection is such that the boom 50 rotates with column 28 and can pivot from a position generally parallel to the tubesheet 14 to a position generally aligned with manway 24. A pair of telescoping hydraulic cylinders 54 (only one shown) are pivotally connected to the lower end of column 28 by a suitable bracket 56 and to the distal end of boom 50 by connection bracket 58 to provide means for pivoting the boom 50 from the position generally parallel to tubesheet 14 to the position generally aligned with the manway 24.

A hollow shaft DC motor 60 is disposed about column 28 and is connected thereto. Motor 60 has a motor base 62 with adjustable feet 64 which engage the dividing plate 22 to provide means for rotating the column 28 and the boom 50 therewith. Disposed within the motor 60 are means for indicating the angular position of the hollow shaft. The motor 60 is reversible to provide rotation of column 28 and boom 50 in either direction.

The boom 50 comprises a pair of generally parallel rails or channels 66 with guideways 68 disposed on the top and bottom portion of each channel 66. The guideways 68 extend longitudinally along the boom 50 and are parallel to each other. A carriage 70 is slidably disposed on the guideways 68 and has a pair of bearings 72 which slidably engage each of the guideways 68 so as to cause the carriage 70 to move rectilinearly and parallel to the longitudinal axis of the boom 50.

Figure 2:
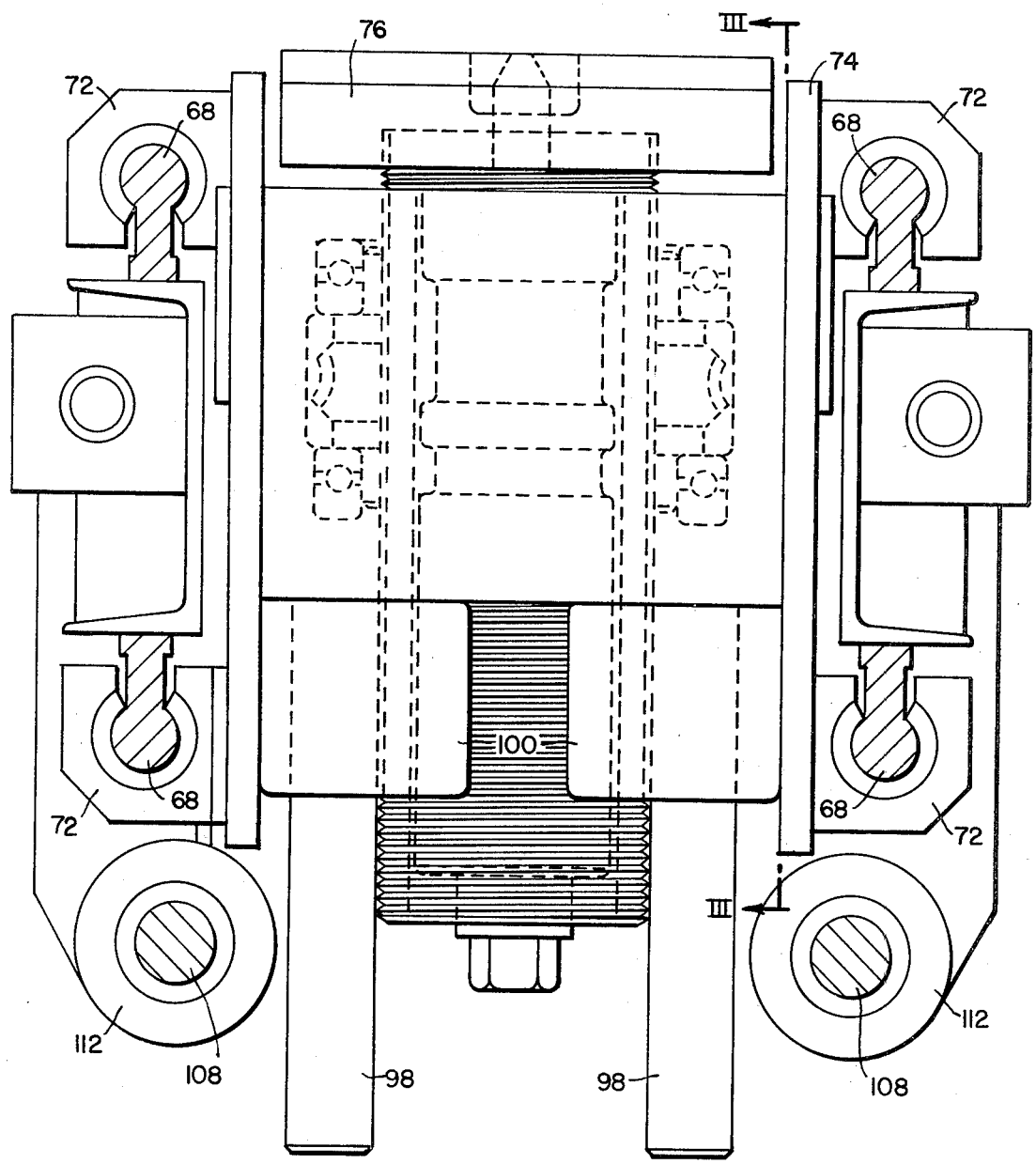
FIG. 2 is a partial sectional view of a tool holding carriage utilized in the present invention.
Figure 3:
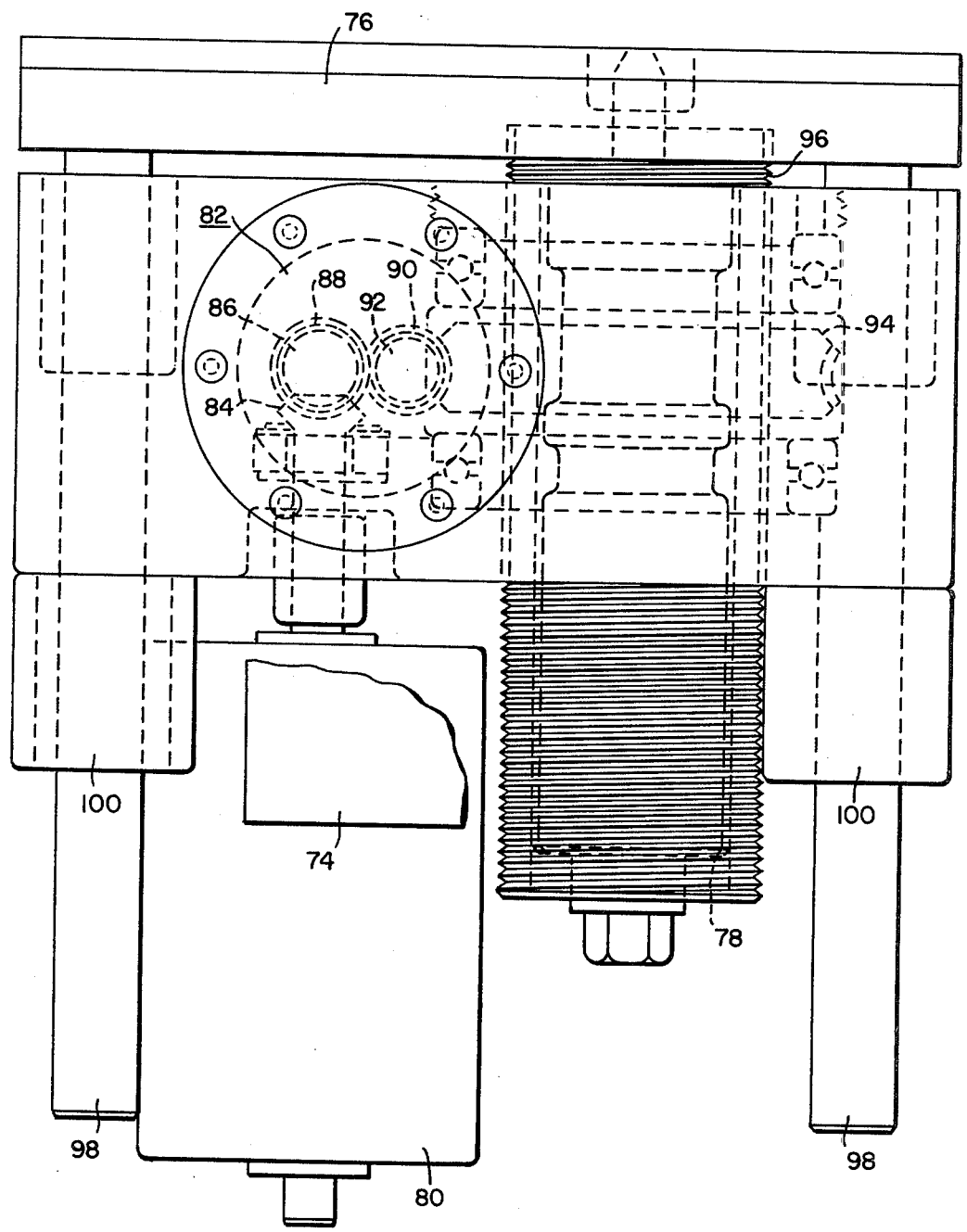
FIG. 3 is a partial sectional view taken along the lines indicated in FIG. 2.

The carriage 70, as best shown in FIGS. 2 and 3, comprises a base 74 and a platform 76 which are disposed generally parallel to each other and to the tubesheet 14 when the longitudinal axis of the boom 50 is parallel thereto. The base 74 is connected to bearings 72 while the platform 76 is disposed above and parallel to base 74. An air motor 78 or other drive means, is connected to platform 76.

Figure 4:
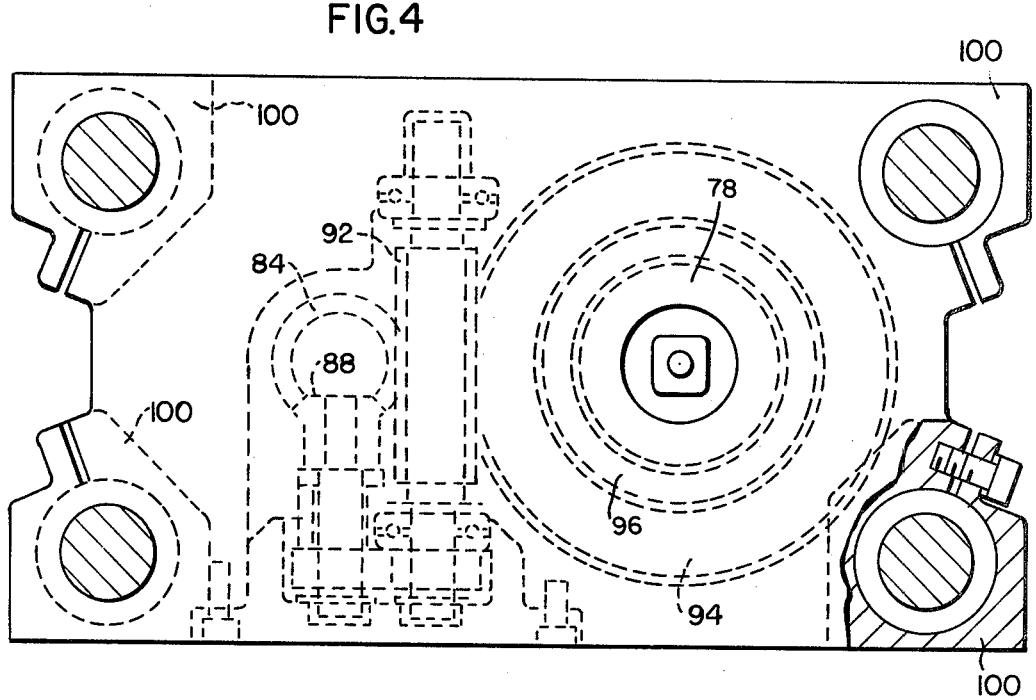
FIG. 4 is a partial sectional plan view of the carriage shown in FIG. 2.

Means for moving platform 76 with respect to base 74 comprises a reversible electric motor 80 or other positioning means for driving a gear train 82. Platform 76 is moved relative to base 74 along a Z axis through gear train 82 which comprises two mateable bevel gears 84 and 86, two mateable spur gears 88 and 90, worm gear 92, worm wheel 94, and threaded sleeve or hollow lead screw 96. Gear train 82 is best illustrated in FIG. 4 which is a partial sectional plan view of the carriage 70 of FIG. 2. Worm wheel 94 is driven by worm gear 92 which mates with gear teeth formed on worm wheel 94's exterior. The inner periphery of worm wheel 94 is machined to mate with lead screw 96 and convert rotary motion imparted to worm wheel 94 into vertical translational movement of lead screw 96. Selective rotation of reversible electric motor 80 provides a raising and lowering of lead screw 96 and connected platform 76. Air motor 78 is supported in lead screw 96 so as to move with platform 76 in its upward and downward motions.

Means for maintaining a parallel relation between base 74 and platform 76 preferably comprises four round bars 98 which are affixed adjacent the four corners of platform 76 and eight ball bushings 100 disposed in base 74 for slidably receiving bars 98.

Figure 5:
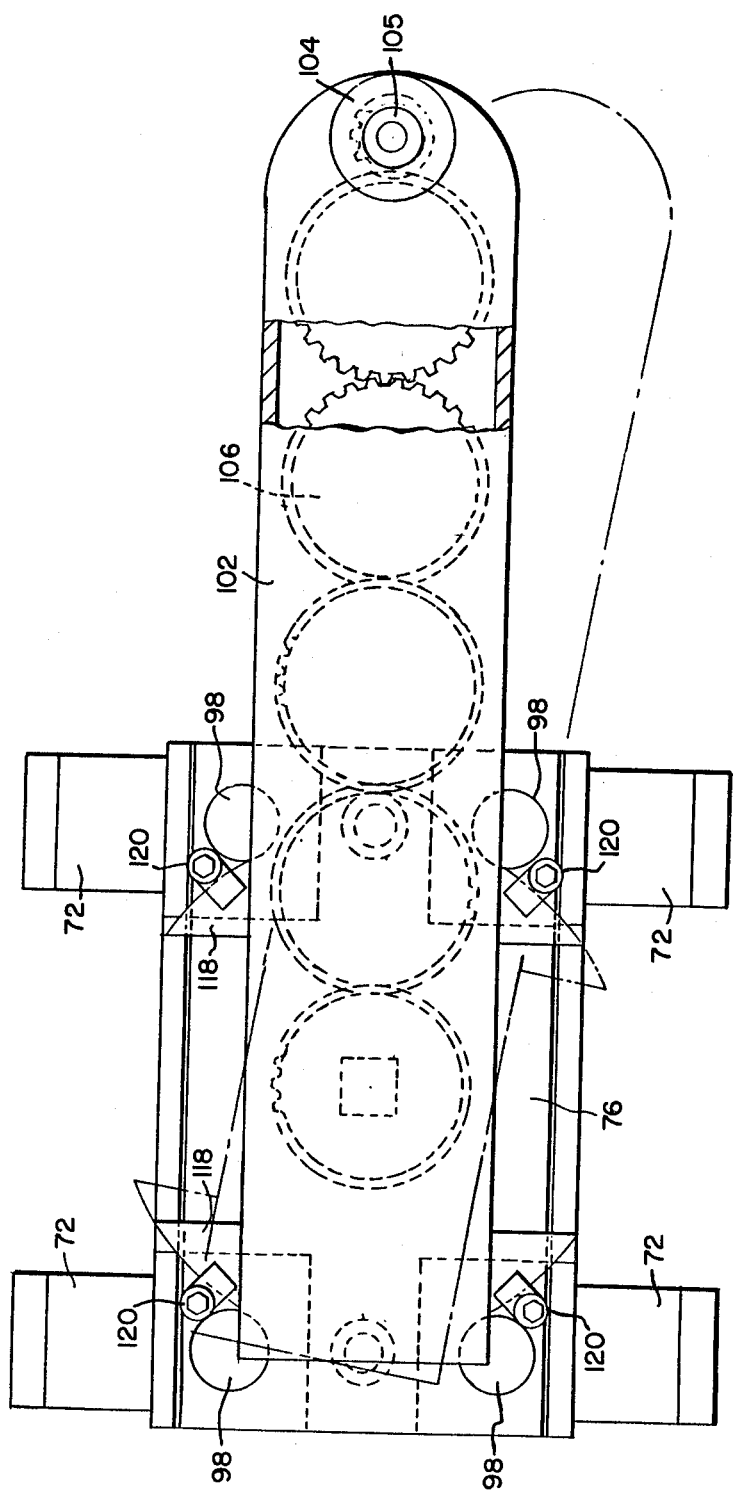
FIG. 5 is a plan view of a tool holder included in the carriage.

A cantilevered tool holder 102 is fastened to platform 76 and coupled to air drive motor 78. The cantilevered tool holder 102, better illustrated in FIG. 5, has a tool receptacle or chuck 104 on the distal end thereof for grasping tool 105 and a train of gears or other drive means 106 connecting the drive motor 78 to the tool chuck 104 providing power to drive a tool 105.

Ball screw 108, drive motor 110, and ball nut 112 are cooperatively associated with boom 50 and carriage 70 to provide means for moving the carriage 70 rectilinearly along the boom 50 and for holding the carriage 70 at any position along the boom 50. The ball screw 108 extends the length of boom 50 and is disposed generally parallel to the longitudinal axis thereof. The ball nut 112 is affixed to the carriage 70 and engages the threads of ball screw 108. Position indicating means 114 is provided to display the position of carriage 70 along boom 50. A pair (only one is shown) of hydraulic cylinders 116 which can be extended to contact wall 20 of the head 10 to steady boom 50 when the tool 105 is performing an operation on the tubes 18 or tubesheet 14.

The cantilevered tool holder 102, as best shown in FIG. 4, has arcuate plates 118 equally spaced on opposite sides of the axis of the drive motor 78. Lugs 120 clamp the arcuate plates 118 and tool holder 102 to the platform 76. Dowels and dowel holes (not shown) are provided in the arcuate plates 118 and in the platform 76 to permit alignment of the cantilevered tool holder 102 with the axis of boom 50 as shown in FIG. 1, rotated 180°, or rotated to form an acute angle with respect to the axis of boom 50, as shown in phantom in FIG. 4. The varying positions of tool holder 102 column 28 cooperate to provide access to all the tubes in any selected portion of the tubesheet 14 and establish accurate positioning of the tool holder 102 to allow remotely controlled repeated operation on any tube 18 in that portion of the tubesheet 14.

A C-shaped stiffening bracket 122 is fastened to the column 28 and spans the motor 60 in order to reduce deflection of column 28 and minimize the forces on the motor 60's bearings.

The apparatus hereinbefore described may be easily and quickly installed in the head 10 of a steam generator 12 and, with an assortment of tools 105, can perform various operations on all of the tubes 18 in a selected portion of the tubesheet 14 being limited only by dividing plate 22. The apparatus so structured is rugged and reliable to permit operation within the close tolerances necessary to retube a steam generator utilizing remote controls. To operate remotely, the angular positioning of the boom 50 in column 28 must be repeatable. Accurate angular position of column 28 and boom 50 and indications thereof are provided by motor 60 with positional locking of the interconnected column 28 and boom 50 being provided by split collar 36 locking column 28 in the desired angular position.

The carriage 70 is positioned by rotating the ball screw 108 with motor 110 which has a brake disposed therein to lock ball screw 108 in any desired position. Ball screw nut 112 rides on the threads of screw 108 and has a plurality of balls which engage the threads thereof. This cooperating combination of screw and nut minimizes backlash allowing precise positioning of the carriage 70 and is not subject to backdriving by the carriage. Thus, when motor 110's brake is engaged, carriage 70 remains fixed in any desired position.

The hydraulic cylinders 54 which raise boom 50 from a position aligned with manway 24 to a position where boom 50 is generally parallel to the tubesheet 14 preferably acts against a stop in the latter position to increase the rigidity of the entire apparatus 26.

It will now be apparent that an improved remotely operable repair apparatus has been provided in which a highly compact tool positioning mechanism is utilized to mechanically engage selected tools 105 with tubesheet 14 and tubes 18. The mechanical positioning mechanism's construction results in a structure whose control is precise and whose size permits of easy entry to the head's interior through the manway 24.

What is claimed is:

1. Apparatus for remotely repairing a tubesheet and tubes accessible from a head of a steam generator which has a centrally disposed partition dividing the head into an inlet and an outlet portion and a manway disposed in each of said portions, said apparatus comprising:

a column rotatably disposed in a portion of said head generally perpendicular to said tubesheet, said column having one end terminating a predetermined distance from said tubesheet;

a boom pivotally mounted adjacent the terminal end of said column;

means for rotating said column and said boom therewith;

means for locking said column and said boom in any rotated position;

means for pivoting said boom from a position generally parallel to said tubesheet to positions generally aligned with each of said manways;

a carriage disposed to ride lengthwise along said boom;

means for moving said carriage lengthwise along said boom and for fixing the position of said carriage on said boom;

said carriage including a base which is generally parallel to the tubesheet when the longitudinal axis of the boom is generally parallel to the tubesheet, a platform generally parallel to the base, a first gear train at least partially supported by the base and connected to the platform for moving said platform relative to said base, means for maintaining a parallel relation between the platform and base, a positioning motor for transmitting power to said first gear train, a tool holder supported by and being selectively cantilevered over said platform, said tool holder including a chuck for grasping tools and a drive motor for driving said chuck, said drive motor being associated with said first gear train and being movable with said platform wherein a plurality of tools operable on the tubes and the tubesheet are graspable by the chuck.

2. The apparatus as set forth in claim 1, wherein the cantilevered tool holder has means disposed therein for transmitting power from the drive motor to the tool chuck.

3. The apparatus as set forth in claim 2, wherein the means for transmitting power from the drive motor to the tool chuck comprises a second gear train.

4. The apparatus as set forth in claim 1, wherein the means for rotating said column is a hollow shaft motor.

5. The apparatus as set forth in claim 1, wherein the means for locking said column comprises a split collar with a gap at the split and a hydraulic cylinder which when activated closes the gap and clamps the column.

6. The apparatus as set forth in claim 1, wherein the boom has four guideways disposed thereon generally parallel to the longitudinal axis of the boom and the carriage has a plurality of bearing pairs which slidably engage each of the guideways.

7. The apparatus as set forth in claim 1, wherein the means for maintaining parallelism between the platform and the base comprise a plurality of bars disposed perpendicular to said platform and a plurality of bearings attached to said base and in slidable engagement with said bars.

8. The apparatus as set forth in claim 1, said first gear train comprising a plurality of interconnected gears and power transmission shafts, said gears including an internal-external gear whose internal teeth are engageable with a cylindrical lead screw, said lead screw housing said drive motor and providing platform displacement when rotated.

9. The apparatus as set forth in claim 1, wherein a support is rotatably disposed on an intermediate portion of the column and has means therein which permit adjustment in two directions in a plane generally parallel to the tubesheet.

10. The apparatus as set forth in claim 1, further comprising: a pivotable support attachable to the lower end of the column and to the head.

* * * * *